US008842088B2

(12) United States Patent
Dinh et al.

(10) Patent No.: US 8,842,088 B2
(45) Date of Patent: Sep. 23, 2014

(54) TOUCH GESTURE WITH VISIBLE POINT OF INTERACTION ON A TOUCH SCREEN

(75) Inventors: Richard H. Dinh, Santa Clara, CA (US); Scott A. Myers, Palo Alto, CA (US); Daniel W. Jarvis, Cupertino, CA (US); Kelvin Kwong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 13/560,984

(22) Filed: Jul. 27, 2012

(65) Prior Publication Data

US 2014/0028578 A1    Jan. 30, 2014

(51) Int. Cl.
*G06F 3/041* (2006.01)

(52) U.S. Cl.
USPC .......................................................... 345/173

(58) Field of Classification Search
USPC ........................................ 345/173, 169, 174
See application file for complete search history.

(56) References Cited

U.S. PATENT DOCUMENTS

| 5,483,261 | A  | 1/1996  | Yasutake |
| 5,488,204 | A  | 1/1996  | Mead et al. |
| 5,825,352 | A  | 10/1998 | Bisset et al. |
| 5,835,079 | A  | 11/1998 | Shieh |
| 5,880,411 | A  | 3/1999  | Gillespie et al. |
| 6,188,391 | B1 | 2/2001  | Seely et al. |
| 6,310,610 | B1 | 10/2001 | Beaton et al. |
| 6,323,846 | B1 | 11/2001 | Westerman et al. |
| 6,690,387 | B2 | 2/2004  | Zimmerman et al. |
| 7,015,894 | B2 | 3/2006  | Morohoshi |
| 7,184,064 | B2 | 2/2007  | Zimmerman et al. |
| 7,663,607 | B2 | 2/2010  | Hotelling et al. |
| 8,479,122 | B2 | 7/2013  | Hotelling et al. |
| 8,665,225 | B2* | 3/2014 | Herz et al. ..................... 345/173 |
| 2006/0026521 | A1 | 2/2006 | Hotelling et al. |
| 2006/0197753 | A1 | 9/2006 | Hotelling |
| 2011/0084911 | A1* | 4/2011 | Simmons et al. ............ 345/173 |
| 2012/0044170 | A1* | 2/2012 | Homma et al. ............... 345/173 |
| 2012/0098766 | A1* | 4/2012 | Dippel et al. ................. 345/173 |
| 2013/0100057 | A1* | 4/2013 | Annett et al. ................. 345/173 |
| 2013/0113720 | A1* | 5/2013 | Van Eerd et al. ............. 345/173 |
| 2013/0147750 | A1* | 6/2013 | Feldman et al. ............. 345/173 |
| 2013/0293490 | A1* | 11/2013 | Ward et al. .................. 345/173 |
| 2013/0335372 | A1* | 12/2013 | Wu ................................ 345/174 |
| 2014/0028568 | A1* | 1/2014 | St. Clair ....................... 345/169 |
| 2014/0033136 | A1* | 1/2014 | St. Clair ....................... 715/863 |

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(Continued)

*Primary Examiner* — Fred Tzeng
(74) *Attorney, Agent, or Firm* — Morrison & Foerster LLP

(57) ABSTRACT

A computer-implemented method is disclosed. The method includes: detecting at least two touches on a touch screen; determining a touch area corresponding to at least two of the touches; determining a location on the touch screen in proximity to, but at least partially outside of, the touch areas; and displaying a point of interaction at the determined location on the touch screen.

25 Claims, 7 Drawing Sheets

(56) References Cited

OTHER PUBLICATIONS

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH GESTURE WITH VISIBLE POINT OF INTERACTION ON A TOUCH SCREEN

FIELD

This relates generally to a system and method for interacting with a touch screen, and more particularly, to implementing touch gestures having one or more visible points of interaction on the touch screen.

BACKGROUND

In recent years, touch sensor panels, touch screens, and the like have become available as input devices. Touch screens, in particular, are becoming increasingly popular because of their ease and versatility of operation as well as their declining price. Touch screens can include a touch sensor panel, which can be a clear panel with a touch-sensitive surface, and a display device, such as an LCD panel or an OLED panel, that can be positioned partially or fully behind the touch sensor panel or integrated with the touch sensor panel so that the touch-sensitive surface can cover at least a portion of the viewable area of the display device.

Touch screens can allow a user to perform various functions by touching (or nearly touching) the touch sensor panel using a finger, stylus or other object. More advanced touch screens are capable of detecting multiple touches simultaneously. In general, touch screens can recognize the position of the one or more touches on the touch sensor panel, and a computing system can then interpret the touches, either individually or as a single gesture in accordance with the display appearing at the time of the touch event, and thereafter can perform one or more actions based on the touch event.

When human fingers or other touch objects with a relatively large contact surface are used for operating a touch screen, the touch object may block the area underneath it on the touch screen from the user's view. This can affect the precision of the touch input. For example, one of the gestures commonly recognizable by existing touch screen devices is a single-touch tracking gesture that follows the movement of a touch by a user's finger or other object on the touch sensor panel. In response to the tracking gesture, the touch screen of the device can, for example, display a line as if it is being drawn by the object touching the screen. However, because the object is typically opaque, the exact point of interaction (or touch area) between the object and the touch screen is not visible to the user as he moves the object on (or over) the touch screen. This can prevent the user from accurately perform the gesture at the intended location on the touch screen, thus affecting the operation being performed (e.g., the drawing of the line) in response to the tracking gesture.

SUMMARY

This relates to methods and systems for displaying one or more visible points of interaction on a touch screen to allow a user to visually track the point(s) of interaction on a touch screen while providing touch input. In particular, a unique touch configuration can be detected on the touch screen indicating that the user wishes to display one or more visible points of interaction on the touch screen to be used as a visual reference while performing various gestures on the touch screen. Displaying one or more visible points of interaction allows the user to perform touch input such as gestures on the touch screen with improved precision. In some examples, as will be discussed in detail below, the visible point of interaction can assist the user in precision drawing.

DETAILED DESCRIPTION

In the following description of examples, reference is made to the accompanying drawings which form a part hereof, and in which it is shown by way of illustration specific examples in which the disclosure can be practiced. It is to be understood that other examples can be used and structural changes can be made without departing from the scope of the examples of this disclosure.

This relates to methods and systems for displaying one or more visible points of interaction on a touch screen to allow a user to visually track the point(s) of interaction on a touch screen while providing touch input. In particular, a unique touch configuration can be detected on the touch screen indicating that the user wishes to display one or more visible points of interaction on the touch screen to be used as a visual reference while performing various gestures on the touch screen. Displaying one or more visible points of interaction allows the user to perform touch input such as gestures on the touch screen with improved precision. In some examples, as will be discussed in detail below, the visible point of interaction can assist the user in precision drawing.

An overview of a conventional user interaction on a touch screen system without any visible points of interaction and its shortcomings are discussed first in the following paragraphs before examples of the present disclosure are discussed in detail. Although the figures show one or more fingers (or thumbs) as the touch object, it should be understood that the fingers can be replaced by any touch object that can block the point of interaction on the touch screen.

Figure 1A:
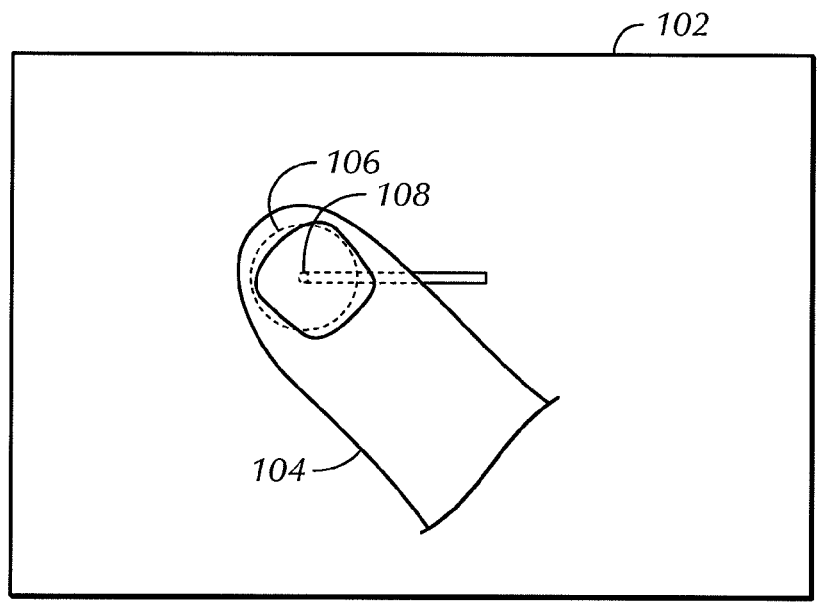
FIGS. 1a and 1b illustrate exemplary user interactions on a conventional touch screen system.
Figure 1B:
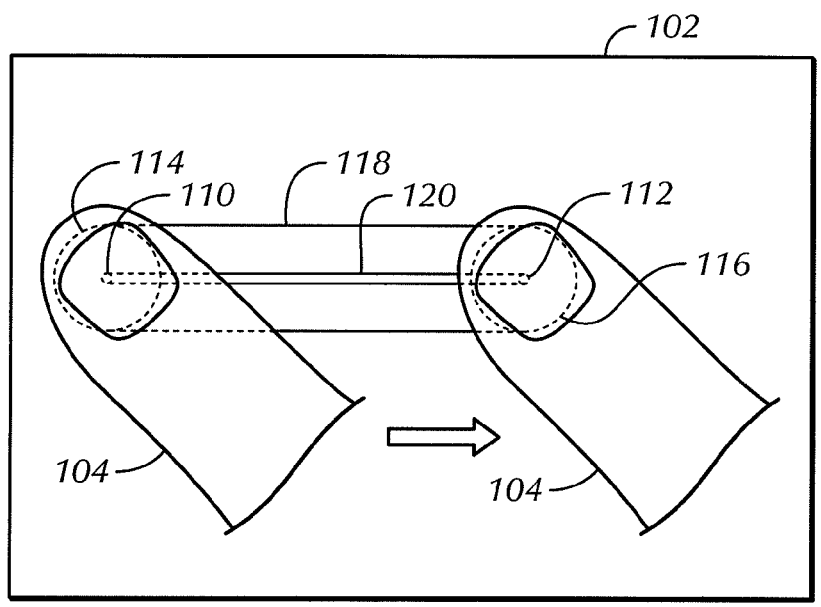

FIGS. 1a and 1b illustrate examples of conventional user interactions on a device with a touch screen 102. In this device, the entire touch screen 102 can be touch-sensitive for detecting single or multi-touch input from a user. The touch locations can be recorded in touch images capturing the touch input from the user. FIG. 1a illustrates a user touching down a finger 104 on the touch screen 102. The touch location 106 can be determined based on the area of contact between the user's finger 104 and the touch screen 102. Relatively speaking, the detected touch area can be much larger than a desired point of interaction 108 as a result of the finger pressing down on the surface of the touch screen. In the example shown, the desired point of interaction 108 is not visible to the user because it is covered by the user's finger 104. As a result, there can be uncertainty about whether the user's finger is actually touching at the intended location on the touch screen. For example, if a user tries to place a cursor at a specific point (e.g., between two letters in a word in a text message) on the touch screen 102 and the cursor is smaller than the touch area, it can be difficult to accurately position the cursor without being able to see exactly where the cursor is on the touch screen 102 with respect to the touch.

FIG. 1b illustrates another example of conventional user interaction with a touch screen. In this figure, a user touches down a finger 104 on the touch screen 102 over a first desired point of interaction 110 and drags the finger 104 until lifting it off over a second desired point 112 on the touch screen. The movement of the finger 104 can follow a path 120 between the first point of interaction 110 and the second point 112. A first touch area 114 can correspond to a first detected touch by the user's finger 104. A second touch area 116 can correspond to the last detected touch 104 before the finger is lifted off the touch screen. The touch input captured during the movement of the finger 104 can create an area of uncertainty 118 between the first touch area 114 and second touch area 116. The area of uncertainty 118 can be much wider than the desired path of interaction 120 which can be a relatively narrow line as shown in FIG. 1b. However, in the example shown, the desired path of interaction 120 is not visible to the user because it is covered by the user's finger 104 as it moves across the touch screen 102. As a result, it can be difficult for the user to move his finger precisely along the intended path. For example, if the user tries to draw a line between two specific points on the touch screen display 102 by moving his finger from one point to the other, it can be difficult to begin exactly at the first point 110, end at exactly the second point 112, and follow the desired path 120 because none of the points of interaction along the line is visible. Similarly if the user tries to sketch a square with multiple strokes, his finger may block his view of where the subsequent stroke should be starting. In other words, it can be difficult to precisely match the end point of the previous stroke. This can be an issue for applications that require precise touch input.

FIGS. 1a and 1b illustrate touch input from a user's finger or fingers. However, the same problem can exist for other types of touch objects such as a stylus, brush, or other objects that have an end that can block the point of interaction from the user's view. The following paragraphs describe various examples of the systems and methods of the present disclosure that provide solutions to the aforementioned issues.

Figure 2A:
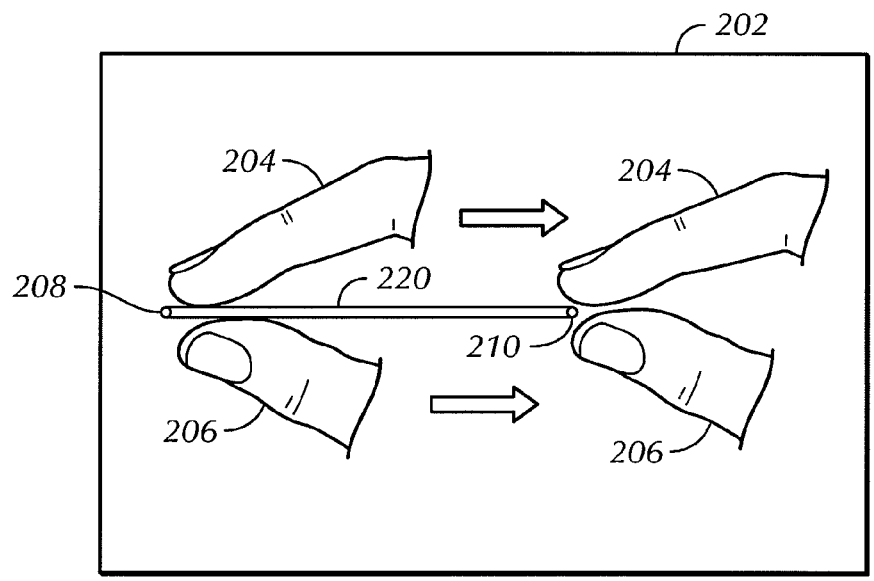
FIGS. 2a and 2b illustrate an exemplary user interaction on a touch screen system with a visible point of interaction on the touch screen display according to an example of the present disclosure.
Figure 2B:
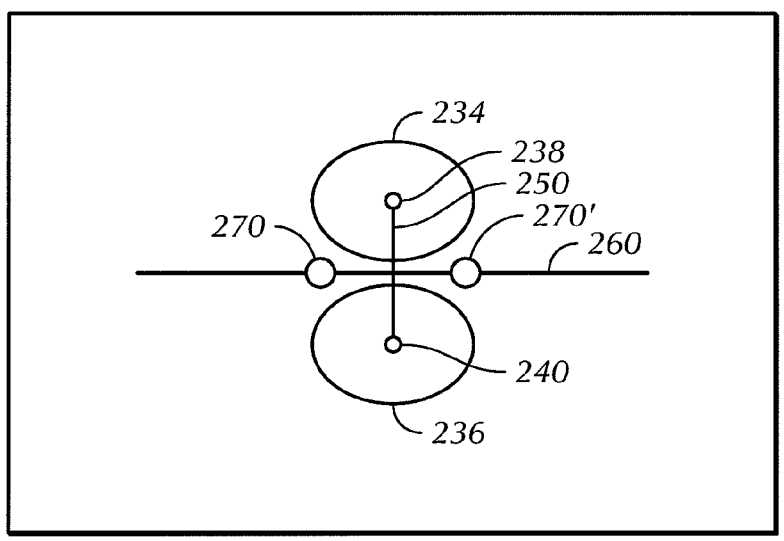

FIGS. 2a and 2b illustrate an exemplary user interaction on a touch screen system with a visible point of interaction 208 on the touch screen 202 according to examples of the present disclosure. In one example, the touch screen can include a touch sensor panel and a display in a stacked structure or an integrated structure. The exemplary structure of the touch screen and its host device will be discussed later in view of FIGS. 7 and 8.

Referring to FIG. 2a, the user can place a first finger 204 and a second finger 206 in a pinched configuration on (or near) the surface of the touch screen 202. In the illustrated example, the first finger 204 can be an index finger and the second finger 206 can be a thumb. Any two fingers or touch objects, however, can be used as the first finger 204 and second finger 206 in this example. As shown in FIG. 2a, when the touch screen 202 detects the pinched configuration, the system can display a visible point of interaction 208 at a point in proximity to the first finger 204 and second finger 206. In this example, the visible point of interaction 208 can be a dot as shown in FIG. 2a. In other examples, the visible point of interaction 208 can also be any other shape or icon, such as a circle, a pointer, or a cursor. As illustrated in FIG. 2a, the point of interaction 208 can be displayed in proximity to the fingers instead of directly below the fingers. As such, it can be visible to the user to allow the user to see the point of interaction while the user continuously interacts with the touch screen 202 by, for example, moving his fingers 204, 206.

In one example, the touch screen device can be designed to recognize the pinched configuration as a signal to enter the two-finger drawing mode discussed above. In other examples, the device can be designed to enter the drawing mode in response to a user touching the touch screen with two fingers in the pinched configuration and, at the same time, apply a certain amount of force on the touch screen. It should be understood that a particular mode such as the two-finger drawing mode can be initiated in response to any suitable gesture or touch configuration.

One of the advantages of having a visible point of interaction is that it allows the user to be able to precisely control his touch input. This enables the user to take advantage of a number of capabilities not available in any of the existing touch screen systems. For example, the user can hold the pinched configuration without moving the fingers to drop a cursor at a specific point on the touch screen display 202 at the visible point of interaction 208. Additionally or alternatively, the user can place his fingers in a pinched configuration next to an icon displayed on the touch screen to highlight or select the icon.

In another example, the user can maintain the pinched configuration while making a stroke movement to draw a line from one point to another point on a touch screen 202. As shown in FIG. 2a, the line can start at the first point of interaction 208, follow the path of interaction 220 as the user moves the fingers in a lateral direction across the touch screen, and concludes at a second point 210 where the user lifts off the fingers to end of the stroke. Because the user can maintain the fingers in the pinched configuration while moving them from the first point 208 to the second point 210, he can visually track the line made up by the series of points of interaction as it is being drawn. This example can allow the line to be drawn with more precision and at the same time provide a natural mechanism for the user to draw on a touch screen. In one example, after the user starts the stroke with the two-finger pinched configuration, he can lift off one of the fingers to continue the stroke as long as the remaining finger is still detected by the touch screen. With the removal of one finger from the touch screen, more of the touch screen can be unblocked from the user. That can make the line even easier to follow. It can also reduce stress on the user's hand, not having to maintaining the pinched configuration.

In one example, the visible point of interaction 210 corresponding to the end of the stroke can be in the same location as the initial visible point of interaction 208 if the user starts and ends the stroke in the same place. It can allow the user to draw a circle in one stroke. Because the line (i.e., points of interactions) can be visible to the user as it is being drawn, it makes it possible for the user to end the stroke at exactly the location where it started. In another example, the user can use the same gesture to encircle one or more files or icons on the touch screen to select these files or icons. Additionally or alternatively, in other examples, the user can hold and move the pinched configuration to control the movement of a mouse cursor. More specifically, the user can place the two fingers in a pinched configuration similar to the one shown in FIG. 2a such that the cursor is visible between the two fingers (e.g., the cursor can be displayed at the location of the dot 208 in FIG. 2a).

FIG. 2b illustrates an exemplary placement of visible points of interaction on the touch screen. As mentioned above and illustrated in FIG. 2a, the locations of the first finger 204 and second finger 206 in a pinched configuration touching or hovering over the surface of the touch screen can be captured in a touch image. As shown in FIG. 2b, a first touch area 234 can correspond to the detected touch by the first finger 204. A first touch center 238 can correspond to the center of the first touch area 234. The center 238 can be determined by any suitable methods depending on the shape and size of the touch area 238. For example, the center 230 can be the centroid of the touch area 238. A second touch area 236 can correspond to the detected touch by the second finger 206. A second touch center 240 can correspond to the center of the second touch area 236. The center 240 can be determined using the same method as center 230 of the first touch area.

In this example, to place one or more points of interaction at a location visible to the user, a first line 250 can be computed and, in some examples, be drawn virtually between the first touch center 238 and the second touch center 240 without actually being displayed on the touch screen. Then, a second virtual line 260 can be computed and, in some examples, be drawn perpendicular to the first virtual line 250 and passing between the first touch location 234 and the second touch location 236. The second virtual line 260 can also be invisible from the user. Next, a visible point of interaction 270 can be displayed along the second virtual line 260 in proximity to first touch location 234 and second touch location 236. Preferably, the placement of the visible point of interaction can be such that it is not blocked by either finger (or other parts of the hand).

As shown in FIG. 2b, more than one visible point of interaction 270, 270' can be displayed. Displaying more than one visible point of interaction can allow the user to see the visible points of interaction 270, 270' before the touch screen device determines whether the user is using a right hand or a left hand to make the pinched configuration. If a right hand is making the pinched configuration on the touch screen, the device can enable the user to manipulate the visible point of interaction 270 on the left side of the touch areas because the visible point of interaction 270' on the right side of the touch areas can likely be covered by the rest of the hand and be unseen by the user. If the user is using fingers on his left hand to make the pinched configuration, the user can manipulate the visible point of interaction 270' on the right side of the pinched configuration. The visible point of interaction 270' on the left side can be covered by the rest of the hand and be unseen by the user.

In another example, only a single visible point of interaction 270 can be displayed. In one example, whether the user is touching with fingers on his right hand or left can be determined by the shape and/or orientation of the touch areas 234, 236. Additionally or alternatively, it can be determined based on the locations of one or more touches by other parts of the hand on the touch screen. For example, the system can detect portions of the user's palm in addition to the pinched configuration to determine which hand is interacting with the touch screen. In another example, the user can first indicate if he is right-handed or left-handed by selecting a setting on the device before interacting with the touch screen. As a result, the point of interaction 270 can be displayed at the correct location and not blocked by the hand. If it cannot be determined which hand is touching the device, the touch screen can display points of interaction on both sides of the detected touches, as illustrated in FIG. 2a.

Figure 3:
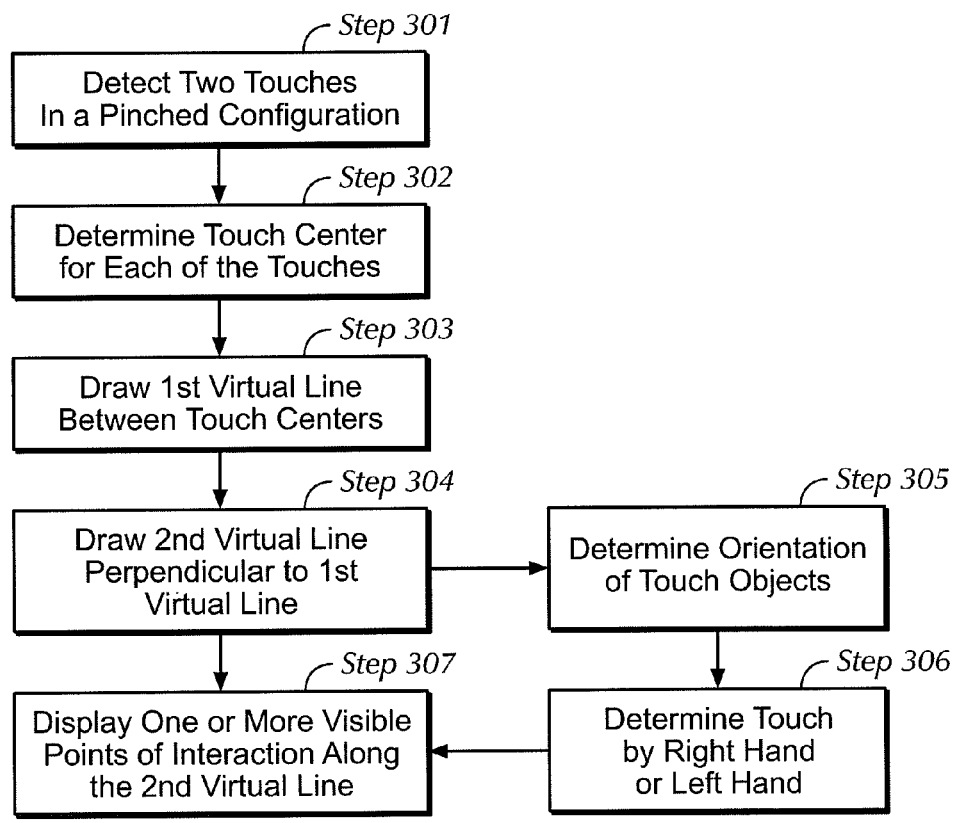
FIG. 3 is a flow chart illustrating exemplary steps of displaying one or more visible points of interaction in response to detecting a unique configuration of touches on the touch screen according to an example of the present disclosure.

FIG. 3 is a flow chart illustrating exemplary steps of displaying one or more visible points of interaction in response to detecting a unique configuration (e.g., the pinched configuration of FIG. 2a) of touches on the touch screen. First, two touches in a pinched configuration can be detected on the touch screen (step 301). Based on the touch image, the touch center for each of the touches can be determined (step 302). Next, a first virtual line can be computed, and in some examples, be drawn between the two touch centers (step 303). Then, a second virtual line can be computed, and in some examples, be drawn perpendicular to the first virtual line (step 304). Both of these virtual lines can be invisible on the touch screen. Optionally, an orientation of the touch objects can be determined based on the detected touch areas and/or other touch data captured by the device as discussed above (step 305). This can be used for determining whether the pinched configuration is formed by fingers on the right hand or left hand (step 306). The touch screen can then display one or more visible points of interaction along the second virtual line (step 307). If steps 305 and 306 were skipped or if it cannot be determined fingers on which hand is touching the screen, two visible points of interaction can be displayed, as illustrated in FIG. 2a. Alternatively, if it can be determined which hand is touching the screen, a single visible point of interaction can be displayed on the proper side of the detected touch areas. Note that although the example of FIG. 3 is described in the context of two detected touches, in other examples a different plurality of touches may also be used, and virtual lines and one or more points of interaction can be computed.

Figure 4A:
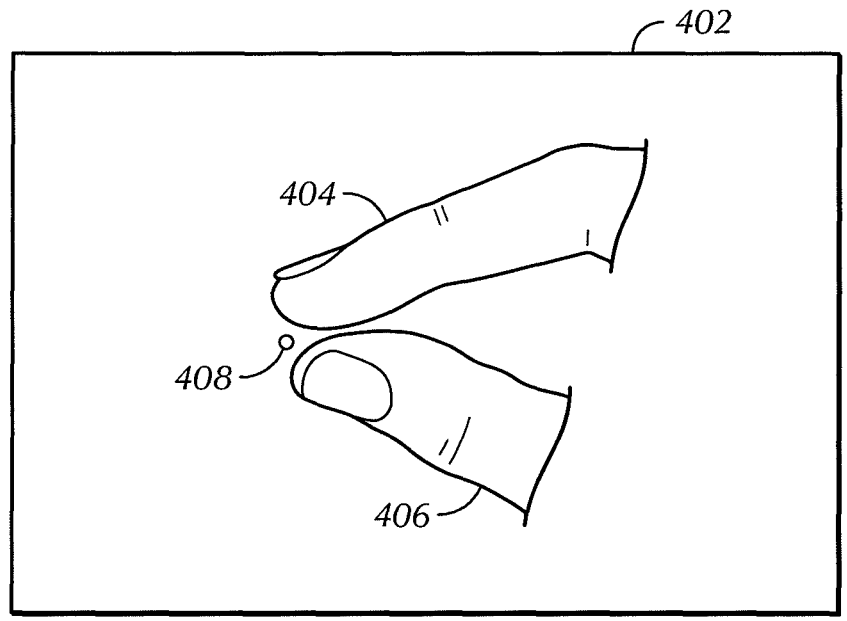
FIGS. 4a and 4b illustrate another exemplary user interaction involving a visible point of interaction on a touch screen system according to an example of the present disclosure.
Figure 4B:
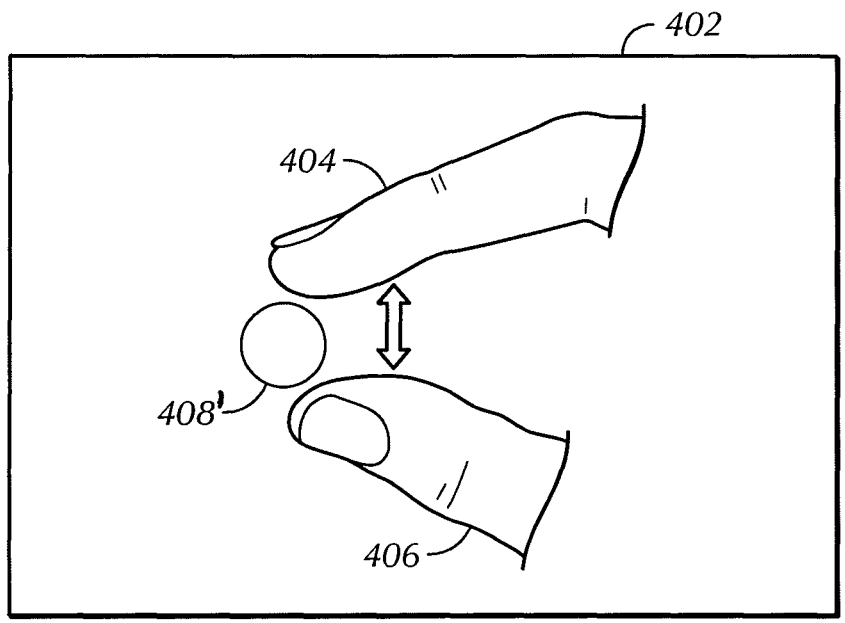

FIGS. 4a and 4b illustrate an additional feature of a user interaction involving a visible point of interaction 408 for a touch screen 400. FIG. 4a illustrates a pinched configuration made by a first finger 404 and a second finger 406 on (or over) the touch screen 402. The touch screen 402 can display a visible point of interaction 408 at a point in proximity to the first finger 404 and second finger 406, according to the method discussed above with respect to FIG. 3. FIG. 4b illustrates that the first finger 404 and second finger 406 can be spread apart to change specific properties of the visible point of interaction 408. As shown in FIG. 3b, spreading apart the first finger 404 and second finger 406 can increase the size of the visible point of interaction 408'. Similarly, the user can bring closer the first finger 404 and second finger 406, to reduce the size of the visible point of interaction 408. The touch screen device can be programmed to recognize the spreading and closing of the fingers as gestures to adjust the thickness of the line to be drawn following the movement of the two fingers. In other examples, the spreading and closing of the fingers can be used to trigger alternative features, and alternative manipulations of the pinched configuration can change the size of the visible point of interaction 408. After the user sets the thickness of the line by adjusting the size of the visible point of interaction, he can then move the fingers in parallel in the pinched configuration to draw a line, as illustrated in FIG. 2a. In one example, the user can continue to adjust the thickness of the line by adjusting the distance between the fingers in motion.

Additionally or alternatively, a rotation of the pinched configuration can be interpreted by the touch screen device as a selection of a drawing implement including, but not limited to, a pen, brush, and calligraphy pen. For example, rotating the pinched configuration clockwise can be interpreted as switching to a brush mode in which any lines drawn in response to the user moving his fingers can have a visual effect as if they are drawn by a brush. Similarly, rotating the pinched configuration counter-clockwise can be interpreted as switching to a calligraphy pen mode. The touch screen can display the lines drawn as having been drawn by a calligraphy pen. In other examples, the rotation of the pinched configuration can be used to trigger alternative features, such as selecting different colors and effects.

In yet other examples, manipulations of the pinched configuration can be used to change way the touch screen system interprets the user's intended drawing implement. For example, the rotation of the pinched configuration can change the way the touch screen system interprets the angle the drawing implement is contacting the touch screen display. The touch screen system can display the line drawn between two points on the touch screen as having been drawn with a drawing implement oriented at the detected angle.

Additionally or alternatively, changing the pressure of the pinched configuration applied to the touch screen display can change the opacity of the line drawn between two points of interaction. For example, applying more pressure can increase the opacity and decreasing the amount of pressure can reduce the opacity. Pressure can be detected based on the increased surface area of a touch location on the touch sensor display. A larger touch area typically corresponds to an increase of force asserted by the user's finger. Additionally or alternatively, pressure can be detected using pressure sensors or any other pressure detecting device embedded in the touch screen.

The examples discuss above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., drawing apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 5:
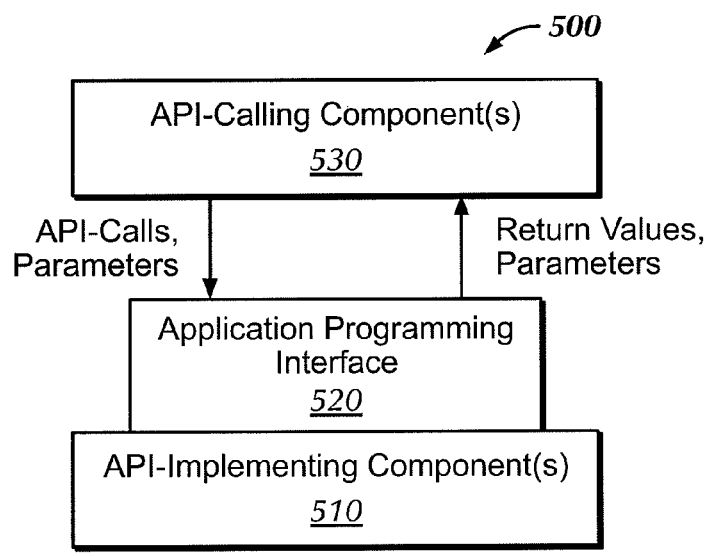
FIG. 5 is a block diagram illustrating an exemplary API architecture, which may be used in some examples of the disclosure.

FIG. 5 is a block diagram illustrating an exemplary API architecture, which may be used in some examples of the disclosure. As shown in FIG. 5, the API architecture 500 includes the API-implementing component 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

It will be appreciated that the API-implementing component 510 may include additional functions, methods, classes, data structures, and/or other features that are not specified through the API 520 and are not available to the API-calling component 530. It should be understood that the API-calling component 530 may be on the same system as the API-implementing component 510 or may be located remotely and accesses the API-implementing component 510 using the API 520 over a network. While FIG. 5 illustrates a single API-calling component 530 interacting with the API 520, it should be understood that other API-calling components, which may be written in different languages (or the same language) than the API-calling component 530, may use the API 520.

The API-implementing component 510, the API 520, and the API-calling component 530 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6:
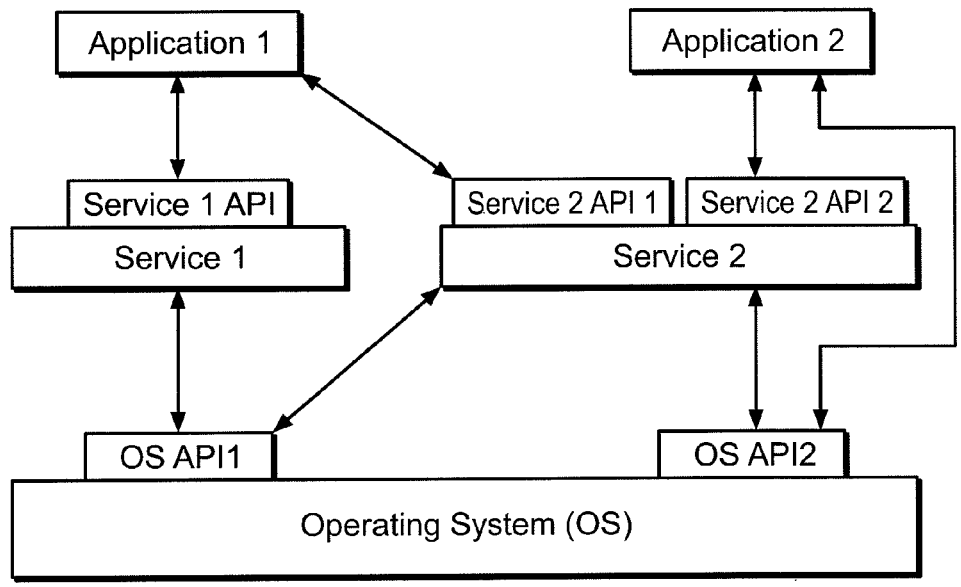
FIG. 6 illustrates an exemplary software stack of an API according to examples of the present disclosure.

In the exemplary software stack shown in FIG. 6, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 7:
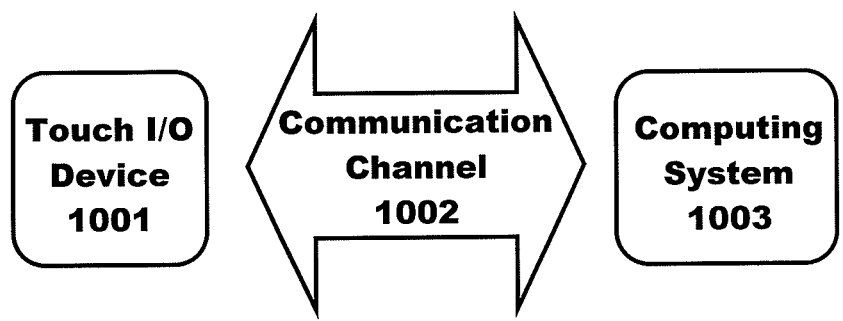
FIG. 7 is a block diagram illustrating exemplary interactions between the touch screen and the other components of the device according to examples of the present disclosure.

FIG. 7 is a block diagram illustrating exemplary interactions between the touch screen and the other components of the device. In FIG. 7, the touch screen illustrated in FIGS. 2a, 2b, 4a, and 4b can be the touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensitive components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof. An exemplary gesture can be the drawing gesture discussed above in view of FIG. 2a.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 8:
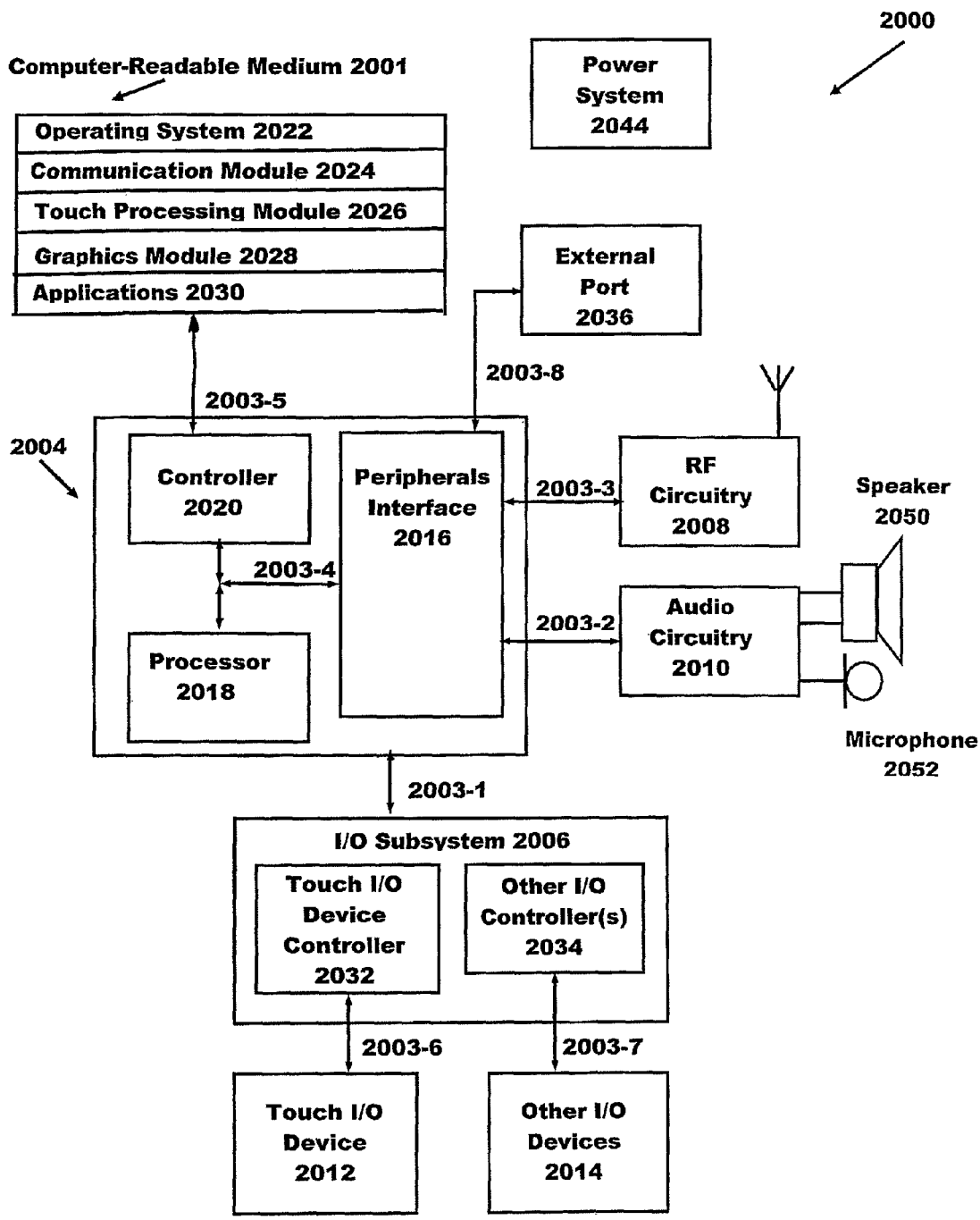
FIG. 8 is a block diagram illustrating an example of a system architecture that may be embodied within any portable or non-portable device according to examples of the present disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 8 is a block diagram of one example of system 2000 that generally includes one or more computer-readable mediums 2001, processing system 2004, I/O subsystem 2006, radio frequency (RF) circuitry 2008 and audio circuitry 2010. These components may be coupled by one or more communication buses or signal lines 2003.

It should be apparent that the architecture shown in FIG. 8 is only one example architecture of system 2000, and that system 2000 could have more or fewer components than shown, or a different configuration of components. The various components shown in FIG. 6 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some examples, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some examples, the software components include operating system 2022, communication module (or set of instructions) 2024, touch processing module (or set of instructions) 2026, graphics module (or set of instructions) 2028, and one or more applications (or set of instructions) 2030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In examples in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Examples in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

In some examples, a computer-implemented method is disclosed. The method includes detecting at least two touches on the touch screen; determining a touch area corresponding to at least two of the touches; determining a location on the touch screen in proximity to, but at least partially outside of the touch areas; and displaying a point of interaction at the determined location on the touch screen. Additionally or alternatively to one or more of the examples disclosed above, the method can further include: capturing movement of the at least two touches on the touch screen; and graphically tracking the movement of the at least two touches by displaying one or more points of interaction along a path determined by the movement of the at least two touches. Additionally or alternatively to one or more of the examples disclosed above, the method can further include continuing to graphically track the movement of at least one of the touches after detecting a lift-off of one of the touches from the touch screen. Additionally or alternatively to one or more of the examples disclosed above, graphically tracking the movement of the touches can further include displaying a line comprising the one or more points of interaction. Additionally or alternatively to one or more of the examples disclosed above, determining a location on the touch screen can further include: determining a touch center of each of the touch area; connecting the touch centers with a computed first virtual line; defining a second virtual line perpendicular to the first virtual line; and selecting a point on the second virtual line as the location. Additionally or alternatively to one or more of the examples disclosed above, the location is determined based on one or more of a size, location, and shape of the touch areas. Additionally or alternatively to one or more of the examples disclosed above, the method can further include adjusting a size of the point of interaction on the touch screen in response to detecting the at least two touches moving apart or closer with respect to each other. Additionally or alternatively to one or more of the examples disclosed above, the size of the point of interaction determines a thickness of a line displayed on the touch screen in response to subsequent movement of the touches. Additionally or alternatively to one or more of the examples disclosed above, the method can further include determining whether the two touches are in a pinched configuration; and if the touches are in a pinched configuration, displaying the point of interaction at the determined location. Additionally or alternatively to one or more of the examples disclosed above, the displayed point of interaction is one of a dot, cursor, pointer, and marker. Additionally or alternatively to one or more of the examples disclosed above, the method can further include detecting a rotation of the at least two touches. Additionally or alternatively to one or more of the examples disclosed above, the method can further include switching to a drawing mode that simulates drawing with a particular drawing implement in response to the detected rotation. Additionally or alternatively to one or more of the examples disclosed above, the method can further include changing a color of the point of interaction in response to the detected rotation. Additionally or alternatively to one or more of the examples disclosed above, an angle of the rotation determines an angle a simulated drawing implement is contacting the touch screen.

In some examples, an electronic device is provided. The electronic device can include a touch screen for receiving touch input; a processor to execute instructions; and a memory coupled with the processor to store instructions, which when executed by the processor, cause the processor to perform operations to generate an application programming interface (API) that allows an API-calling component to perform the following operations: detecting at least two touches on the touch screen; determining a touch area corresponding to each of the at least two touches; determining a location on the touch screen in proximity of, but at least partially outside of the touch areas; and displaying a point of interaction at the determined location on the touch screen. Additionally or alternatively to one or more of the examples disclosed above, the operations can further include: capturing movement of the at least two touches on the touch screen; and graphically tracking the movement of the at least two touches by displaying one or more points of interactions along a path determined by the movement of the at least two touches. Additionally or alternatively to one or more of the examples disclosed above, the operations can further includes: continuing to graphically track the movement of one of the two touches after detecting a lift-off of the other touch from the touch screen. Additionally or alternatively to one or more of the examples disclosed above, graphically tracking the movement of the touches further includes displaying a line comprising the one or more points of interactions. Additionally or alternatively to one or more of the examples disclosed above, the operations can further include: determining a touch center of each of the touch area; connecting the touch centers with a first virtual line; defining a second virtual line perpendicular to the first virtual line; and selecting a point on the second virtual line as the location.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A computer-implemented method comprising:
   detecting at least two touches on a touch screen;
   determining touch areas each corresponding to one of the at least two touches;
   determining a location on the touch screen in proximity to, but at least partially outside of the touch areas; and
   displaying a point of interaction at the determined location on the touch screen.

2. The method of claim 1, further comprising:
   determining movement of the at least two touches on the touch screen; and
   displaying one or more points of interaction along a path determined by the movement of the at least two touches.

3. The method of claim 2, further comprising continuing to display the movement of at least one of the touches after detecting a lift-off of one of the touches from the touch screen.

4. The method of claim 2, wherein displaying the movement of the touches further comprises displaying a line comprising the one or more points of interaction.

5. The method of claim 1, wherein determining a location on the touch screen further comprises:
   determining a center of each touch area;
   determining a first line between each touch area;
   determining a second line perpendicular to the first line; and
   selecting a point on the second line as the location.

6. The method of claim 1, wherein the location is determined based on one or more of a size, location, and shape of the touch areas.

7. The method of claim 6, wherein the size of the point of interaction determines a thickness of a line displayed on the touch screen in response to subsequent movement of the touches.

8. The method of claim 1, further comprising adjusting a size of the point of interaction on the touch screen in response to detecting the at least two touches moving apart or closer with respect to each other.

9. The method of claim 1, further comprising:
   determining whether the two touches are in a pinched configuration; and
   if the touches are in a pinched configuration, displaying the point of interaction at the determined location.

10. The method of claim 1, wherein the displayed point of interaction is one of a dot, cursor, pointer, and marker.

11. The method of claim 10, further comprising switching to a drawing mode that simulates drawing with a particular drawing implement in response to the detected rotation.

12. The method of claim 10, further comprising changing a color of the point of interaction in response to the detected rotation.

13. The method of claim 10, wherein an angle of the rotation determines an angle a simulated drawing implement is contacting the touch screen.

14. The method of claim 1, further comprising detecting a rotation with respect to a line between the at least two touches.

15. A non-transitory computer readable storage medium having stored therein instructions, which when executed by a device with a touch screen, cause the device to perform a method comprising:
   detecting at least two touches on the touch screen;
   determining touch areas each corresponding to one of the at least two touches;
   determining a location on the touch screen in proximity to, but at least partially outside of the touch areas; and
   displaying a point of interaction at the determined location on the touch screen.

16. The non-transitory computer readable storage medium of claim 15, wherein the method further comprises:
   determining movement of the at least two touches on the touch screen; and displaying one or more points of interaction along a path determined by the movement of the at least two touches.

17. The non-transitory computer readable storage medium of claim 16, wherein the method further comprises continuing to display the movement of at least one of the touches after detecting a lift-off of one of the touches from the touch screen.

18. The non-transitory computer readable storage medium of claim 16, wherein displaying the movement of the touches further comprises displaying a line comprising the one or more points of interactions.

19. The non-transitory computer readable storage medium of claim 15, wherein determining a location on the touch screen further comprises:
  determining a center of each touch area;
  determining a first line between each touch area;
  determining a second line perpendicular to the first line; and
  selecting a point on the second line as the location.

20. The non-transitory computer readable storage medium of claim 15, wherein the method further comprises:
  determining whether the two touches are in a pinched configuration; and
  if the touches are in a pinched configuration, displaying the point of interaction at the determined location.

21. An electronic device, comprising:
  a touch screen for receiving touch input;
  a processor to execute instructions; and
  a memory coupled with the processor to store instructions, which when executed by the processor, cause the processor to perform operations to generate an application programming interface (API) that allows an API-calling component to perform the following operations:
    detecting at least two touches on the touch screen;
    determining touch areas each corresponding to one of the at least two touches;
    determining a location on the touch screen in proximity of, but at least partially outside of the touch areas; and
    displaying a point of interaction at the determined location on the touch screen.

22. The electronic device of claim 21, wherein the operations further comprise:
  determining movement of the at least two touches on the touch screen; and
  displaying one or more points of interactions along a path determined by the movement of the at least two touches.

23. The electronic device of claim 22, wherein the operations further comprise:
  continuing to display the movement of one of the two touches after detecting a lift-off of the other touch from the touch screen.

24. The electronic device of claim 22, wherein displaying the movement of the touches further comprises displaying a line comprising the one or more points of interactions.

25. The electronic device of claim 22, wherein the operations further comprise:
  determining a center of each of the touch area;
  determining a first line between each touch area;
  determining a second line perpendicular to the first line; and
  selecting a point on the second line as the location.

* * * * *